United States Patent [19]
Will

[11] Patent Number: 5,105,470
[45] Date of Patent: Apr. 14, 1992

[54] METHOD AND SYSTEM FOR RECOGNIZING CHARACTERS

[75] Inventor: Terry A. Will, Charlotte, N.C.

[73] Assignee: International Business Machines Corporation, Armonk, N.Y.

[21] Appl. No.: 491,895

[22] Filed: Mar. 12, 1990

[51] Int. Cl.$^5$ .............................. G06K 9/48
[52] U.S. Cl. ...................... 382/21; 382/13; 382/39
[58] Field of Search ............. 382/21, 23, 39, 55, 382/13

[56] References Cited

U.S. PATENT DOCUMENTS

| | | | |
|---|---|---|---|
| 2,978,675 | 4/1961 | Highleyman | 382/39 |
| 4,115,760 | 9/1978 | Ito | 382/55 |
| 4,757,551 | 7/1988 | Kobayashi et al. | 382/21 |
| 4,888,812 | 12/1989 | Dinan et al. | 382/7 |

Primary Examiner—Leo H. Boudreau
Assistant Examiner—Steven P. Klocinski
Attorney, Agent, or Firm—Kenneth A. Seaman

[57] ABSTRACT

A method and system for recognizing an individual unknown character and a document in which, for black pels, one at a time, a vector is generated indicating what is seen from that pel in each of a plurality of directions in terms of white or black pels. That vector is compared to a table created from a large experience, generating a probability for each character in the character set that the vector from the pel on the unknown character is that character. As this process is repeated for other black pels in the unknown character, the probabilities associated with the various pels for each respective character are multiplied together to create a probability for the unknown character. An optional skeletonization of the character prior to recognition assists in the recognition by making the character only one pel width for a stroke, rather than a variable quantity.

4 Claims, 4 Drawing Sheets

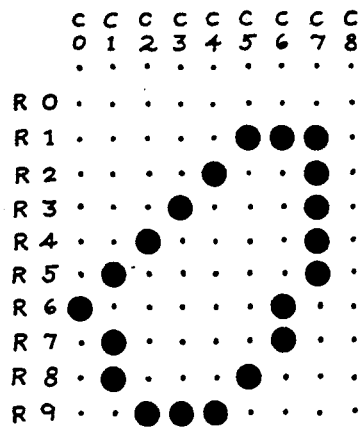
Fig. 5.
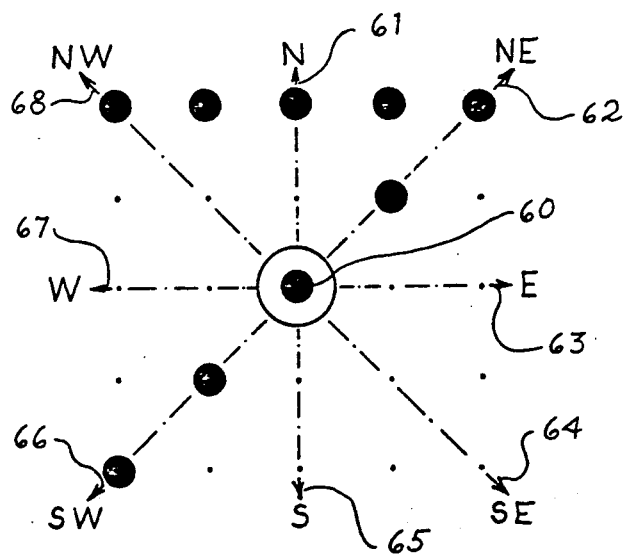
Fig. 6.
| VIEW DESCRIPTION | VIEW NUMBER |
|---|---|
| NO BLACK PEL IN PATH | 0 |
| ADJACENT PEL IS BLACK | 1 |
| ADJACENT PEL IS WHITE FOLLOWED EVENTUALLY BY BLACK | 2 |
Fig. 7.

| N | NE | E | SE | S | SW | W | NW |
|---|----|---|----|---|----|---|----|
| 2 | 1  | 0 | 0  | 0 | 1  | 0 | 2  |

Fig. 8.

| LINE | LOCATION | N | NE | E | SE | S | SW | W | NW | $P_1$ | $P_2$ | $P_3$ ... |
|------|----------|---|----|---|----|---|----|---|----|----|----|----|
| 1    | $R_1, C_5$ | 0 | 0 | 1 | 2 | 2 | 1 | 0 | 0 | $a_1$ | $a_2$ | $a_3$ |
| 2    | $R_1, C_6$ | 0 | 0 | 1 | 1 | 2 | 0 | 1 | 0 | $b_1$ | $b_2$ | $b_3$ |
| 3    | $R_1, C_7$ | 0 | 0 | 0 | 0 | 1 | 2 | 1 | 0 | $c_1$ | $c_2$ | $c_3$ |
| 4    | $R_2, C_4$ | 0 | 1 | 2 | 2 | 2 | 1 | 0 | 0 | $d_1$ | $d_2$ | $d_3$ |
| 5    | $R_2, C_7$ | 1 | 0 | 0 | 0 | 1 | 2 | 2 | 1 | $e_1$ | $e_2$ | $e_3$ |
| .    | .        |   |    |   |    |   |    |   |    |    |    |    |
| .    | .        |   |    |   |    |   |    |   |    |    |    |    |
| .    | .        |   |    |   |    |   |    |   |    |    |    |    |
| n-3  | $R_8, C_5$ | 2 | 1 | 0 | 0 | 0 | 1 | 2 | 2 | $f_1$ | $f_2$ | $f_3$ |
| n-2  | $R_9, C_2$ | 2 | 2 | 1 | 0 | 0 | 0 | 0 | 1 | $g_1$ | $g_2$ | $g_3$ |
| n-1  | $R_9, C_3$ | 2 | 2 | 1 | 0 | 0 | 0 | 1 | 2 | $h_1$ | $h_2$ | $h_3$ |
| n    | $R_9, C_4$ | 2 | 1 | 0 | 0 | 0 | 0 | 1 | 2 | $i_1$ | $i_2$ | $i_3$ |

Fig. 9.

METHOD AND SYSTEM FOR RECOGNIZING CHARACTERS

CROSS REFERENCE TO RELATED PATENTS

The present invention relates to the following patents which are specifically incorporated herein by reference:

1. "Method and System For Locating Amount Field On A Document" Ser. No. 491,897 filed by T. A. Will concurrently. sometimes hereinafter referred to as the "Field Find Patent".

2. "Method and Apparatus For Segmenting Characters In An Amount Field On A Financial Document" Ser. No. 491,900, now abandoned filed concurrently by H. Norton and sometimes hereinafter referred to as the "Segmentation Patent".

3. U.S. Pat. No. 4,888,812 to Dinan et al. "Document Image Processing System".

The above patens are all owned by International Business Machines Corporation, the assignee of the present application.

BACKGROUND OF THE INVENTION

1. Field Of Invention

The present invention relates to a method and system for recognizing characters carried on a document. More specifically, the present invention relates to a novel method and system for recognizing characters, particularly those printed by hand, and particularly on a check or other financial document.

2. Background Art

Various techniques for recognizing or identifying characters on a document have been proposed in the past.

Typically these systems have used either templates or tested key regions for particular features of a character. That is, the template or overlay for each character in a set would be matched against the character to be recognized and the character would be recognized if it matched within a preset tolerance of the overlay.

Within digital processing, various techniques are known for recognizing characters through the use of a tree logic or neural network logic of asking successive questions based upon the answer to the previous question and then arriving at a conclusion as to what the character is at the end.

While these systems generally have advantages in using less storage and less processing, they have been found to be inadequate in identifying characters particularly those written by hand in a free or unconstrained manner.

Accordingly, the prior art systems for identifying characters have limitations and disadvantages which are undesirable. This is particularly true in the attempts to recognize handprint characters in unconstrained fields.

The present invention overcomes the limitations and disadvantages of the prior art systems by providing a method and system for recognizing characters.

The present invention has the advantage that it is not particularly limited to the size of the characters being recognized, the orientation of the writing or the care with which the individual features are formed. The present invention also has the advantageous effect that stray markings, either background noise or additional marks that the writer has included have a minimum effect on the recognition process. The present invention includes an optional, though desirable, method for normalizing or skeletonizing a character image which initially includes a stroke width of multiple pels into a stroke width of a single pel.

The present invention uses a test or training set to calculate historical probabilities which are used in a look up table. Depending upon the accuracy required, this training set could be expanded as necessary.

This system is also inherently flexible, in that the level of confidence to call a particular character recognized is set and reset either within the program or by operator control. That is, in a system where it is important that no character be read incorrectly and additional failure to reads are acceptable, the threshold for a successful recognition could be set very high. In another system where the penalty for an incorrect reading (a substitution) is not significant, the threshold could be set very low so that the fail to read percentage is kept very low.

This system is also flexible in that the difference in probability between the first choice and the second choice can be adjusted. That is, if the second choice is almost as likely as the first choice (within a preset range), then the character can be rejected as unread to avoid an erroneous recognition.

The foregoing and other objects and advantages of the present invention will be apparent to those skilled in the art of character recognition in view of the following description of the invention the appended claims and the accompanying drawings.

BRIEF DESCRIPTION OF THE DRAWINGS

FIG. 5 shows a skeletonized and normalized version of the character of FIG. 4.

FIG. 6 illustrates a view pattern recognition system useful in developing a multi directional vector of what is seen from a given pel.

FIG. 7 is a table which describes the sighting from a particular pel in a particular direction and assigns a view number to that sighting.

FIG. 8 illustrates the sample vector for a pel in FIG. 6.

FIG. 9 illustrates a table including view vectors and probabilities for the character of FIG. 5.

DETAILED DESCRIPTION OF THE PREFERRED EMBODIMENT

Figure 1:
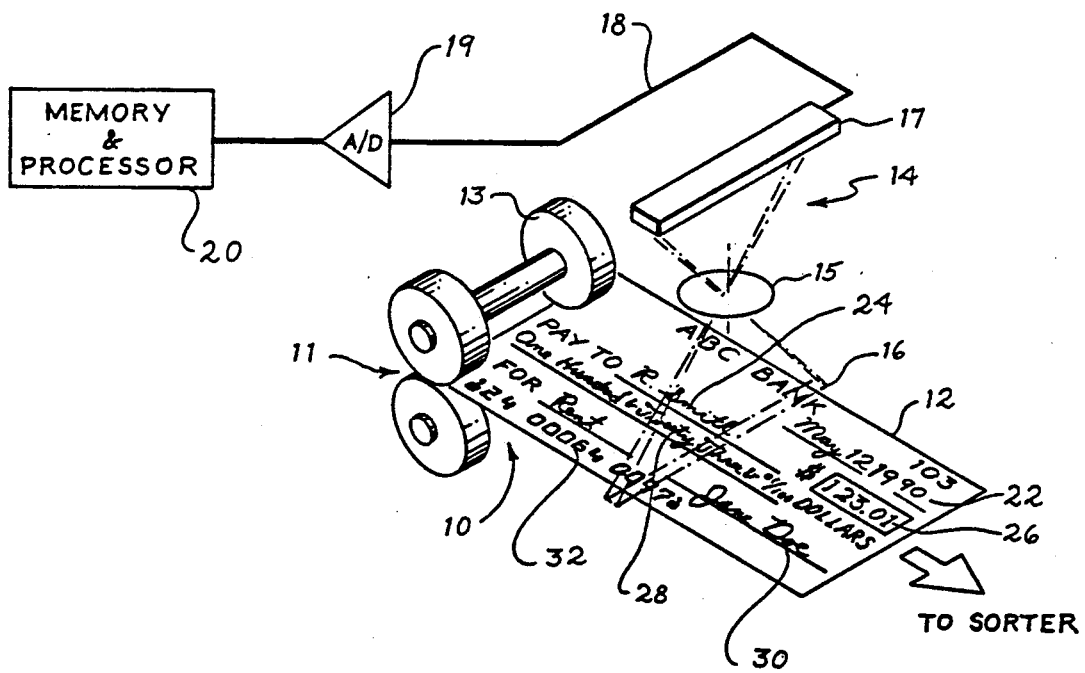
FIG. 1 illustrates the environment of the present invention, an image document processing system.

FIG. 1 illustrates an image capture system 10 within a document image processing system 11, such as IBM's Model 3890 Image Plus High Performance Transaction System. Such a system typically uses a transport 13 to move a document 12 one at a time from an input hopper (not shown) sequentially past a plurality of other processing stations and finally into one of several output hoppers or pockets, based usually upon the information content read from the document under program control as it passes. This transport moves the document at a high speed (over 300 inches per second in a Model 3890 which allows the system to process 2400 documents per minute).

An optical system 14 including a focusing lens 15 uses an extended array 17 to capture an electrical representation of each line 16 of the document, based on either the black/white or gray characteristics of the document. While the resolution of the system depends on the design and components, one example divides each inch into 240 picture elements (pels or pixels) in each of the horizontal and vertical directions.

The array 17 is commercially available from various manufacturers, such as Reticon, and may be a charge coupled device in which the impinging light on each sensor develops an electrical signal proportional to the amount of light. The electrical signals pass on line 18 to an analog-to-digital converter 19, which together with thresholding, converts each pel into a digital representation which is then stored in memory 20 for storage and/or further processing as desired. For further details of an image capture and processing system, see U.S. Pat. No. 4,888,812 to Dinan et al., which is specifically incorporated herein by reference.

The document 12 includes a variety of indicia, some of which may be printed and some may be handwritten. Other documents may include typewritten characters or those printed by machine. This indicia includes a date field 22, a payee line 24, an amount field 26 (sometimes referred to as a "courtesy amount field" which comprises numerals rather than words in most cases), a field 28 including the amount in words, a signature 30 and a MICR codeline 32.

Figure 2:
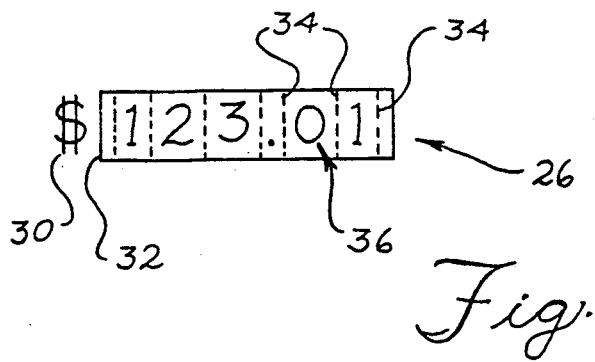
FIG. 2 shows an amount field from a sample check of FIG. 1.

FIG. 2 illustrates the amount field 26 from the document 12 of FIG. 1 enlarged. The amount field 26 includes a "$" identified by the reference numeral 30, a box 32 with the amount field therein. Dotted lines referenced by the numeral 34 illustrate how the amount field has been segmented. This segmentation is accomplished through any one of several known techniques, one of which is described in the Segmentation Patent.

As a result of the segmentation, each character is separately identified, if possible, for presentation to the character recognition algorithm of the present invention.

In this case, the reference numeral 36 identifies the 0 in the amount field occurring after a decimal point and before the 1. Later discussion herein, particularly in connection with FIGS. 4, 5, and 9, will illustrate the use of this character in the recognition process.

Figure 3:
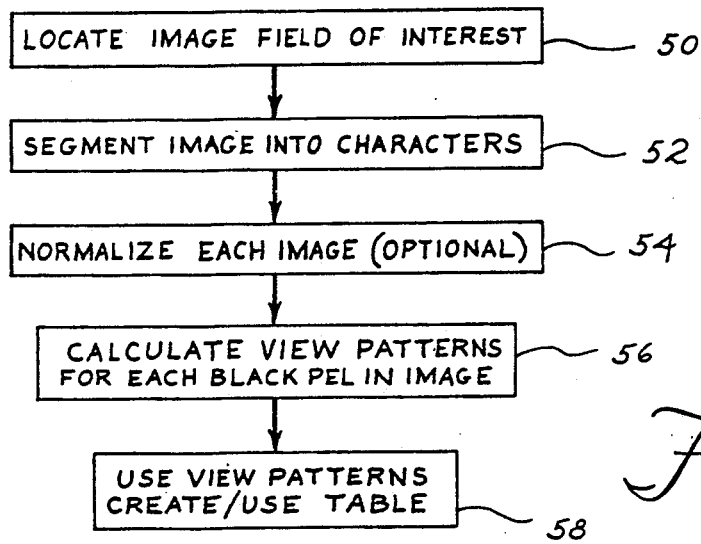
FIG. 3 shows a flow diagram for the logic of the present invention.

FIG. 3 illustrates the logic or flow in the present invention. At block 50, a field, such as the amount field, is identified, and if desired, that section is copied for further processing into a small but separate field. This could be advantageously done by the Field Find Patent referenced above. Next, at block 52, the image is segmented into individual characters or other indicia to be recognized such as a "$", decimal point or other individual character to be recognized. This could be done as described in the Segmentation Patent in the preferred embodiment, or any other similar processing system.

Next, at block 54, the image is normalized, then the view patterns are calculated at block 56. All this will be discussed in more depth in connection with FIGS. 6 to 9 particularly FIG. 6. These view patterns in the preferred embodiment include taking view patterns at each of the black pels in the normalized image from the block 54. Next, at block 58, the view patterns are used. Since the present invention anticipates using a training set to calculate the probabilities for each of the vectors generated (see FIG. 8), in the training mode these view patterns are used to generate a look up table.

The present invention has been described in conjunction with a normalized image, that is, one which has been reduced to a skeleton or stroke width of a single pel wide. If this is not done, then one may desire to know not only where the next black pel is, but how long a black segment is there. This suggests one or more additional view descriptions could be added to FIG. 7 and the vectors of FIGS. 8 and 9. While this may add to the accuracy of recognition in some cases, it also adds substantially to the storage and processing power required.

The view patterns of an unknown character X are applied to the previously created table to look up the probability that a given vector (FIG. 8) relates to each of the characters in the character set.

Figure 4:
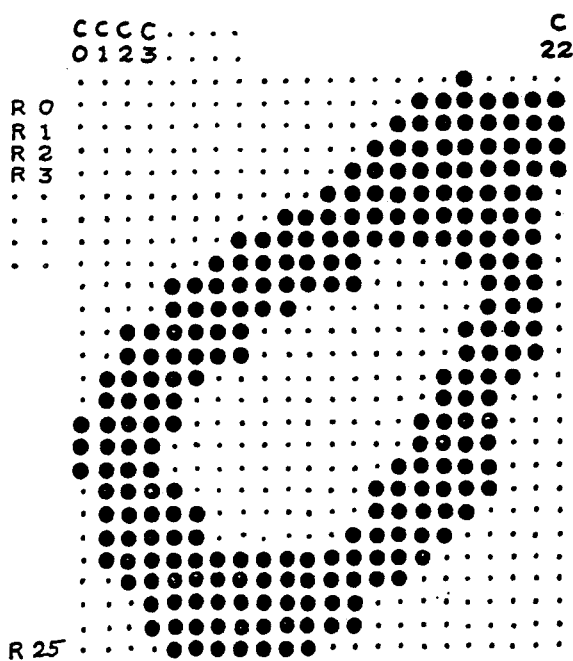
FIG. 4 shows a matrix of the pel elements of a character from the amount field of FIG. 2.

FIG. 4 illustrates the character 0 from the amount field in FIG. 2. As shown in this Figure, there are a plurality of horizontal rows (R0–R25) and a plurality of columns (column C0–column C22) which comprised the rectangular array that has been identified as containing the character 0.

This character is then normalized to create the image of FIG. 5, including rows (R0–R9) and columns (C0–C7).

FIG. 6 illustrates a different character (the numeral 7) with a central pel 60 which has been circled and eight radiating lines numbered 61–68 leading in each of the eight identified compass directions, that is, line 61 looks north from the pel 60 line 62 looks northeast, line 63 looks east and so forth until line 68 looks northwest. Along each of these lines throughout the entire character box the question is whether a black pel is in that path and, if so, where.

As shown in FIG. 7, the view description from any given pel looking in any particular direction either has no black pel in that path (in which case it is assigned a view number of 0), the adjacent pel in that path is black (in which case it is assigned a view number of 1) or the adjacent pel is white followed eventually by a black in that path (in which case the view number of 2 is assigned). A view number of 2 is also assigned in the case where a diagonal line passes between two blacks only ½ space away. These view numbers and view descriptions are somewhat arbitrarily assigned, and other techniques of describing and numbering could be used to advantage.

Accordingly, in FIG. 8 a view pattern for the pel 60 in FIG. 6 has been identified, that is, in the direction along the line 61, looking north from the pel 60 the adjacent pel is white followed later by a black pel leading to a view number of 2. In the northeast direction along line 62, the adjacent pel is black, leading to a view number of 1 in the northeast direction. In the east direction along line 63 there is no black pel in the path from pel 60 to the eastern edge of the character, therefore the view number is 0. Similarly, in the southeast direction there is again no black pel in the path as is the case in the southern direction along line 65. Along the line 66, looking southwest from the pel 60 the adjacent pel is black leading to a view number of 1 being assigned. In the direction west from the pel 60 there is no black pel in the path leading to the view number of 0 and in the northwest direction along line 68 there is an adjacent white pel followed eventually by a black pel, leading to a view number of 2 for the northwest direction.

Applying this technique to the pattern of FIG. 5, creates the table shown in FIG. 9. In this table the line number 1, which corresponds to location R1, C5, has the vector of "00122100" in the directions of north (N), northeast, east, southeast, south southwest west, and northwest respectively.

Line 2 is a similar view pattern for the next black pel located at R1, C6. This continues for each black pel, only some of which have been listed here.

Then for each of the vectors created (for example, the vector 00122100) for line 1, there is a probability that has been established and stored in a look up table that that vector is associated with each character state permitted. For the numeral set, the character states permitted would be the numerals 0-9, while an amount field might have extra characters such as a $, a decimal point, and other symbols which are permitted and would be attempted to be recognized.

After all of the probabilities for lines 1 through N have been determined, the probability that the character to be identified is the first character in the set is the product of the individual probabilities that is, for the first element in the set it would be $A1 \times B1 \times C1 \times D1 \times E1$ etc. through I1. The probability that this character is the second character in the set would be $A2 \times B2$ etc. through I2.

These products then can be normalized and the probability of an unknown character being one element can be compared with the probability that it is the next element. Appropriate recognition algorithms then can be used to set threshold limits as to how high a probability in absolute value is required in order to consider the character successfully recognized and secondly how far that first candidate has to be greater than the second candidate before the issue is too close to call.

Of course, many modifications and adaptations to the present invention could be made to advantage without departing from the spirit of this invention. Further, some features of the present invention could be used without corresponding use of other features. For example, normalization is disclosed and may be desirable in some cases but not in others. Further, the view numbers assigned and the number of directions are arbitrary and may be increased or decreased as desired and as permitted by the processing system. Accordingly, this description should be considered as merely illustrative of the principles of the present invention and not in limitation thereof.

Having thus described the invention, what is claimed is:

1. A method of recognizing an unknown character from a digitized image thereof, comprising the steps of:

identifying the black pels in the image of the unknown character;

for selected black pels in the image, identifying the location of the next black pel within said unknown character in each of a plurality of directions;

generating a vector of information for each selected black pel based upon the location of the next black pel in each direction identified;

comparing each vector to a table indicating the probability that the vector identifies each character in a character set; and multiplying the probabilities of the pel vectors for each character in the character set, with the unknown character being identified as the character producing the highest probability product.

2. A method of recognizing a character including the steps of claim 1 wherein the steps of the method further include a step of reducing a stroke to a single pel width where possible, before the step of identifying black pels in the image.

3. A method of recognizing a character including the steps of claim 1 wherein vectors and probabilities are generated for each of eight directions, each being spaced 45 degrees from an adjacent direction.

4. A method of recognizing a character including the steps of claim 2 wherein the steps of identifying the location of the next black pel and generating a vector are undertaken for each black pel in the image.

* * * * *